United States Patent [19]
Cook et al.

[11] Patent Number: 5,412,415
[45] Date of Patent: May 2, 1995

[54] DISTRIBUTION OF DIGITIZED COMPOSITE AM FDM SIGNALS

[75] Inventors: Andrew R. J. Cook, Clacton-on-Sea; David W. Faulkner, Ipswich, both of England

[73] Assignee: British Telecommunications public limited company, London, England

[21] Appl. No.: 941,066

[22] PCT Filed: Apr. 10, 1991

[86] PCT No.: PCT/GB91/00568
§ 371 Date: Oct. 13, 1992
§ 102(e) Date: Oct. 13, 1992

[87] PCT Pub. No.: WO91/15927
PCT Pub. Date: Oct. 17, 1991

[30] Foreign Application Priority Data
Apr. 10, 1990 [GB] United Kingdom ................. 9008162

[51] Int. Cl.⁶ .............................................. H04N 7/16
[52] U.S. Cl. ........................................ 348/6; 348/724; 370/50; 370/70; 455/6.1
[58] Field of Search ...................... 358/86; 455/45, 43, 455/6.1, 5.1; 359/118, 119, 125; 385/24; H04N 7/01, 7/22, 7/20, 7/16; 370/7, 71, 73, 69.1, 124, 49.5, 50, 70; 348/486, 473, 723, 724, 6

[56] References Cited

U.S. PATENT DOCUMENTS

| | | | |
|---|---|---|---|
| 4,183,054 | 1/1980 | Patisaul | 359/118 |
| 4,385,381 | 3/1983 | Alexis | 370/70 |
| 4,602,279 | 7/1986 | Freeman | 348/473 |
| 4,999,831 | 3/1991 | Grace | 370/50 |
| 5,125,100 | 6/1992 | Katzmelson | 358/86 |
| 5,136,411 | 8/1992 | Paik | 358/86 |
| 5,136,652 | 8/1992 | Jibbe | 370/69.1 |
| 5,153,763 | 10/1992 | Pidgeon | 359/125 |
| 5,191,576 | 3/1993 | Pommier et al. | 370/50 |

FOREIGN PATENT DOCUMENTS

| | | | |
|---|---|---|---|
| 409100 | 1/1991 | European Pat. Off. | 370/49.5 |
| 21216 | 2/1979 | Japan | 370/50 |
| 2128454 | 4/1984 | United Kingdom | 358/86 |

OTHER PUBLICATIONS

*Symposium Record*, CATV Sessions 16th International TM Symposium, Montreux, 17–22 Jun. 1989, Tan et al.: "CATV Distribution Over a Fibre Optic Local Network", pp. 262–272.

*Funkschau*, vol. 62, No. 1, 29 Dec. 1989/90, (Munich, DE), Gendisor et al., "Signale auf der Glasfaser", pp. 51–55.

*Conference Europeenne sur les communications Optiques*, Cannes, 21–24 Sep. 1982, Roza et al.: "TV System with Remote Selection for Subscriber Glass Fiber Networks", pp. 497–500.

*Electronic Letters*, vol. 24, No. 7, 31 Mar. 1988, Medis et al.: "20 Km Single-Mode Optical Fibre System for Multichannel Video", pp. 442–443.

*Patent Abstracts of Japan*, vol. 10, No. 363, 5 Dec. 1986 & JP A 61158281 (Matsushita Electric Ind. Co. Ltd.), 17 Jul. 1986.

Primary Examiner—James J. Groody
Assistant Examiner—Chris Grant
Attorney, Agent, or Firm—Nixon & Vanderhye

[57] ABSTRACT

Signals, such as television signals, are distributed from a head-end station via a fibre network. The signals are amplitude modulated on carriers at different frequencies, and the different carriers combined to form a composite analogue signal. In the head-end station the composite analogue signal is clipped to reduce the peak-to-mean ratio and the clipped composite signal is digitized. The resulting digital data is transmitted onto the fibre network and is received at an optical receiver. The optical receiver reconstitutes the composite analogue signal for reception by a termination. In one example the composite analogue signal has a bandwidth of one octave or less, and is digitized by sampling at a sampling rate below the Nyquist rate.

18 Claims, 3 Drawing Sheets

DISTRIBUTION OF DIGITIZED COMPOSITE AM FDM SIGNALS

BACKGROUND OF THE INVENTION

1. Field of the Invention

The present invention relates to the distribution of signals on a network and in particular to the distribution of AM (amplitude modulated) television signals.

2. Related Art

Conventionally, television has been broadcast as AM signals with different channels modulated onto sub-carriers at different frequencies. Existing cable television services using copper coaxial cable have adopted corresponding analogue AM techniques to provide channels in a region of the same UHF spectrum used for broadcast television.

It is now proposed to use cable networks such as fibre optic networks for the distribution of television signals. The wide bandwidth offered by such networks offers the possibility of upgrading to carry future wideband services such as HDTV and the same network may also be used for services other than television, such as telephony. However whilst the use of AM techniques is necessary if the television signals are to be received by conventionally equipped television sets there are a number of problems associated with the use economically of AM techniques on optical networks. In particular the carrying of AM optical signals requires less splitting in order to allow a high power budget, and the use of highly specified linear opto-electronic devices.

BRIEF SUMMARY OF THE INVENTION

According to the present invention, a method of distributing signals from a head-end station via a network comprises combining a plurality of AM channels modulated on sub-carriers at different frequencies to form a composite analogue signal, and characterised by treating the composite analogue signal to reduce the peak-to-mean ratio, digitizing the composite analogue signal, transmitting resulting digital data onto the network, receiving the digital data at a receiver and reconstituting the composite analogue signal for reception at a termination.

Preferably the network is an optical network and the receiver is an optical receiver. Preferably the composite analogue signal is treated by clipping the signal.

A preferred aspect of the present invention provides a method of distributing, e.g., television signals which is particularly well-adapted to use with optical networks whilst at the same time maintaining compatibility with conventional analogue television sets. As noted above, television signals used for terrestrial broadcasting are modulated onto sub-carriers at different frequencies. When a composite signal is formed by adding together the different channels the resulting waveform has a much higher peak-to-mean ratio than the individual carriers. It is therefore possible to clip or compress the maxima and minima before quantizing without significantly degrading the performance. The A/D converter used for digitizing the signal can then operate over a more restricted input amplitude range and so requires fewer quantization levels to achieve an adequate output video signal-to-noise ratio.

Preferably the method includes receiving the digitized signal at a node remote from the termination and transmitting the reconstituted signal onwards for reception at the termination.

The detection of the digital data is advantageously carried out at a node such as a distribution box or pedestal near the customer's premises. The television signals may then be delivered over conventional coaxial cable in a standard format, avoiding the need for a special adapter or other equipment at the customer-end.

Preferably the composite analogue signal has a bandwidth of one octave or less and is digitized by sampling at a sampling rate below the Nyquist rate.

Preferably, in addition to or as an alternative to clipping the composite analogue signal the method further comprises compressing the composite analogue signal at the head-end station and applying complementary expansion at the receiver.

Companding may be carried out either in the analogue or in the digital domain and preferably the compression function is the cumulative distribution function of the Gaussian probability distribution function.

According to a further aspect of the present invention there is provided a system for distributing signals comprising a head-end station, one or more receivers, and a network connecting the head-end station to the or each receiver, and characterised by the head-end station including an input stage arranged to receive a composite analogue signal comprising a plurality of AM channels modulated on sub-carriers at different frequencies, converter means arranged to treat the composite analogue signal to reduce the peak-to-mean ratio and to digitize the composite analogue signal, and transmitter means arranged to transmit the resulting digital data onto the network, the receiver including reconstituting means arranged to reconstitute the composite analogue signal and output means arranged to output the composite analogue signal for reception by a termination.

A method and system in accordance with the present invention will now be described in further detail with reference to the accompanying drawings, in which:

FIG. 3 is a diagram showing an alternative arrangement for the multiplexer of FIG. 2.

A system for distributing television signals via an optical fibre network comprises a head-end station 1 and a number of optical receivers 2 connected to the head-end station 1 via a fibre network 3. In the present example the fibre network 3 is a passive optical network using a star topology but the present invention is equally applicable to other fibre optic networks using different topologies.

Figure 1:
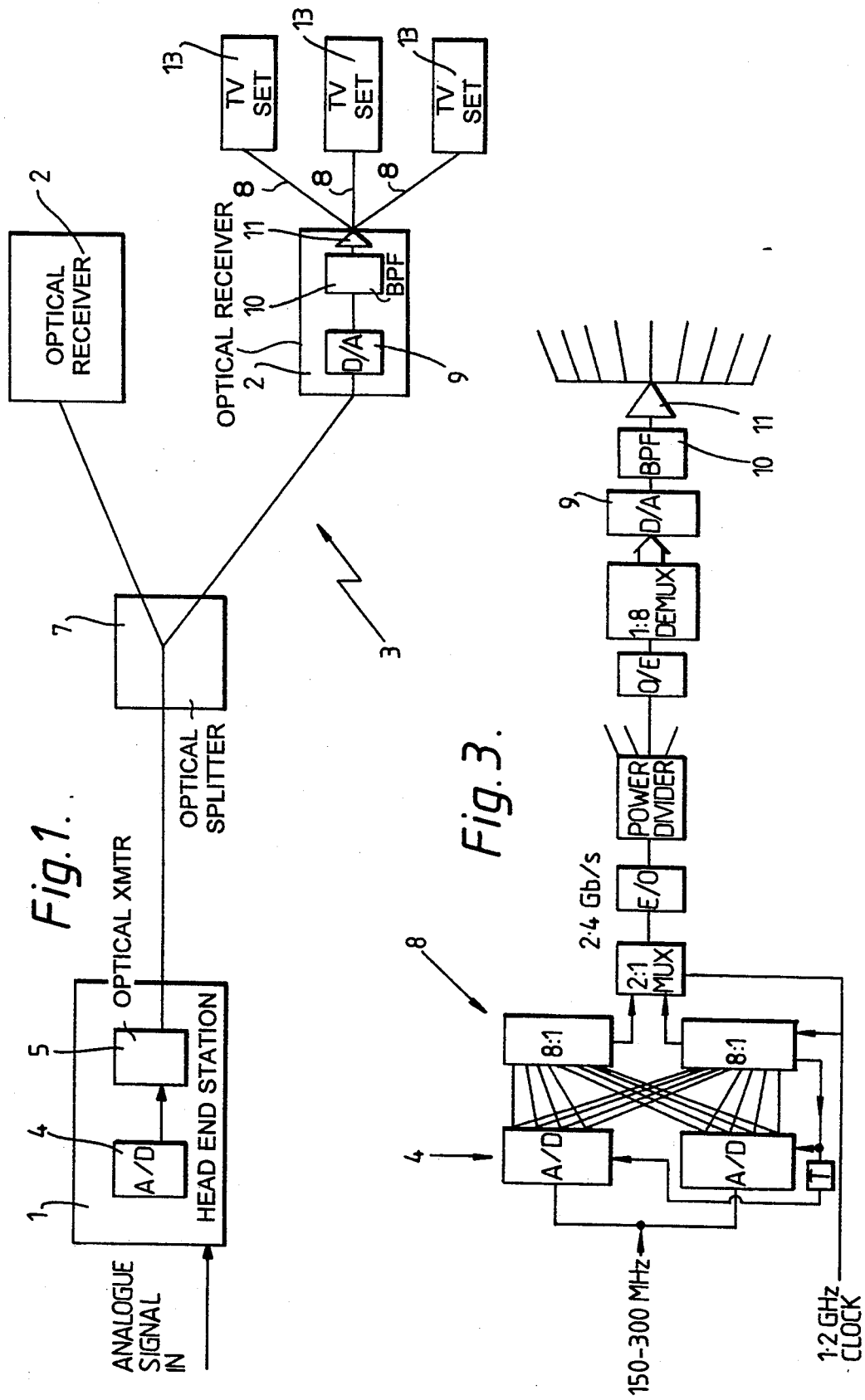
FIG. 1 is a block diagram showing a distribution system.

The head-end station 1 receives at its input a composite analogue signal which in the present example covers the spectrum from 470–860 MHz. This input signal comprises sub-carriers at different frequencies amplitude-modulated with different television signals. These signals are input to an A/D converter 4 which, as described in further detail below, clips and digitises the signal. An optical transmitter 5 modulates an optical signal with the digital data output by the A/D converter and outputs the signal onto the fibre network 3. The signal passes through different stages of the fibre network 3, including one or more passive optical splitters 7 and is received by the optical receivers 2. For clarity only two optical receivers 2 are shown in FIG. 1, but in practice many more may be connected to each network. At the receivers 2 which may, for example, be positioned in street cabinets, the composite optical signal is reconstituted from the optical data and output as an analogue signal via coaxial cables 8 to conventional television sets 13.

Figure 2:
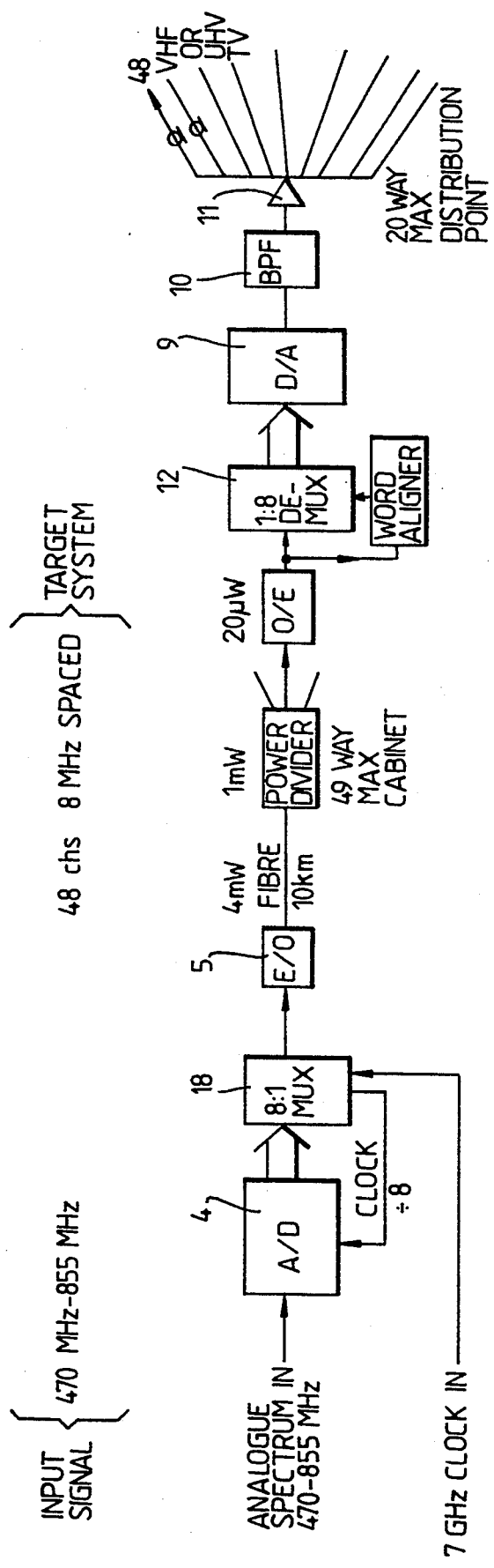
FIG. 2 is a block diagram showing a signal path in greater detail.
Figure 4A:
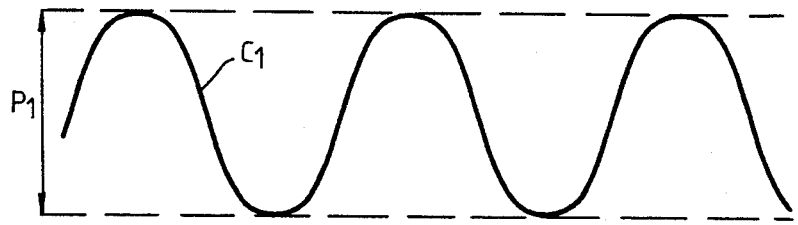
FIGS. 4a–4d are diagrams showing sub-carriers and a composite signal.
Figure 4B:
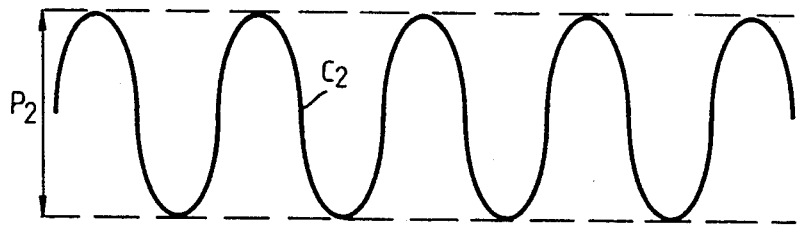
Figure 4C:
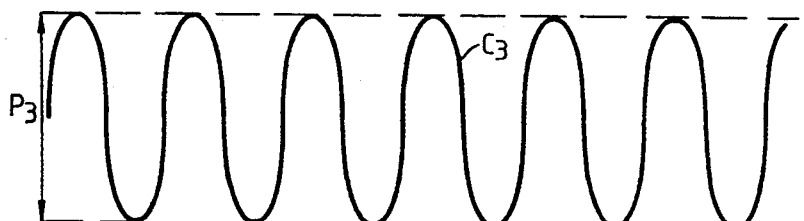
Figure 4D:
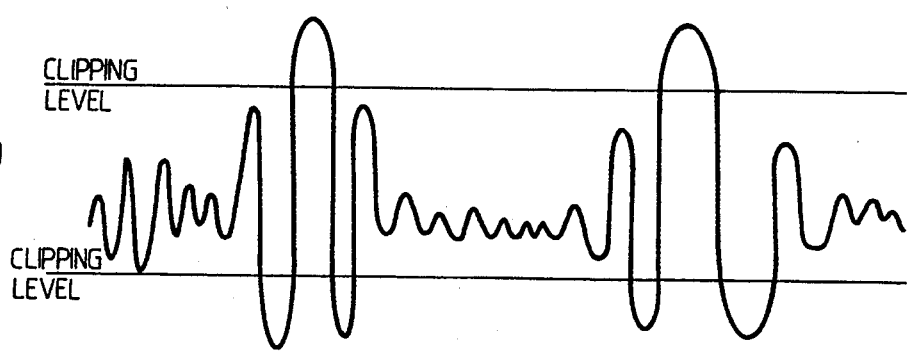

The signal path from the head-end station 1 to the television set is shown in greater detail in FIG. 2. Data is output from the A/D converter 4 in parallel as 8-bit words. An 8:1 multiplexer 18 converts the output from the A/D converter 4 to a serial bit stream. This bit stream is used to modulate the output from the optical transmitter 5 using conventional techniques. The operation of the multiplexer 18 is locked to a 7 GHz clock generated locally in the head-end station. This clock signal is divided by eight to provide a lower rate clock for the A/D converter 4. In transmission over the fibre network 3 the signal output by the transmitter 5 may be split up to 49 ways, within the constraints of the power budget in the present example. At the receiver 2 a 1:8 demultiplexer 12 assembles 8-bit parallel words from the serial datastream and outputs those 8-bit words to a D/A converter 9. The output from the D/A converter 9 passes through a band pass filter 10 and via an output amplifier stage 11 to up to 20 different television sets 13 connected to the receiver 2 by conventional coaxial cables.

The system may be used to distribute signals to so-called "cable ready" sets. Such sets typically have a VHF baseband input up to 450 MHz. For such systems use can be made of aliasing channels present in the lower frequency range. These are channels at frequencies below those of the original components of the composite analogue signal which are generated as a result of sampling below the Nyquist rate. In this case the reconstituting filter 10 is a low-pass filter rather than a band-pass filter. The low frequency channels output from the reconstituting filter are inverted unless the input to the A/D converter is first inverted.

FIGS. 4a–4d, show schematically the formation of the composite analogue signal from three carriers $c_1$, $c_2$, $c_3$. The carriers have amplitudes $p_1$, $p_2$, $p_3$ respectively. The mean (rms) level of each carrier is then $p_n/(2\sqrt{2})$. The different component carriers add together to form the composite signal shown in FIG. 4d. It can be shown that the amplitude of the composite signal, when it comprises n channels, each of amplitude p is np and its mean level is $n(p/2\sqrt{2})$. The peak-to-mean ratio of the composite signal is therefore far greater than that of the individual sub-carriers. At the input to the A/D converter relatively severe clipping may be applied to limit the dynamic range of the signal prior to quantization making it possible to minimize the number of quantization levels without significant loss in the quality of the signal. Clipping may be applied using an appropriate clipping stage before the A/D converter. Alternatively if that converter has suitable clipping characteristics clipping may be achieved by overloading it by a suitable margin. Any suitable conventional clipping function can be employed as is in common in signal quantization systems. See, for example, Bylanski et al, "Digital Transmission Systems", chapter 2 on "Digital-system impairments", pp. 26–35, *Institution of Electrical Engineers*, 1976.

The composite analogue signal is limited in bandwidth to less than one octave. Not only does this serve to reduce second order intermodulation distortion but it makes possible sampling at a rate below the Nyquist minimum, that is twice the frequency of the maximum frequency component of the signal. Sampling below the Nyquist rate causes aliasing distortion. When however the signal is confined to less than one octave and sampled at a rate only slightly greater than the maximum frequency component the aliasing distortion falls in the unused frequency band below the signal octave band. The aliasing distortion therefore does not compromise the performance of the system and the bit rate of the system is only one half that needed for full Nyquist sampling. As noted above, when generating signals for cable-ready VHF TV sets the production of low frequency aliasing channels may be used to shift the received channels into the desired frequency range.

The A/D converter 4 defines a number of amplitude bands and determines which amplitude band matches the sample value. Each amplitude band is represented by a binary word and a byte is output accordingly. The resultant bit rate when these bytes are converted to a serial stream by the 8:1 multiplexer 8, is the product of the sampling rate and the number of digits in a byte. Clipping minimizes the number of quantisation levels required and so enables a reduction in the byte size and bit rate.

Optionally compression may be applied to the signal before or after it is sampled by the A/D converter 4. Known A/D converters for video signals use linear quantizing with one output byte representing one quantization level. The present system however by applying compression to the composite analogue signal as it is digitized reduces the number of possible output words required for a given output video quality by a factor of two or more, giving a further saving in the bit rate. The preferred compression function is the cumulative distribution function of the Gaussian probability distribution function (PDF). If the input waveform to the compressor has a Gaussian PDF, the output PDF from the compressor is uniform with output in the range 0 to 1. This uniform PDF can then be quantised linearly and each output codeword is then equi-probable. The compressor and matching expander at the receiver may be realized in hardware using a network of diodes and resistors, or in software using a look-up table following a suitable linear A/D converter.

The digital circuits in the head-end station 1 and the receiver 2 are synchronized using word alignment techniques. For example, the least significant bit in each word may be identified by a periodic function such as a Barker code by regular bit stealing. This sequence is then detected using a suitable sampler, logic function and clock slip circuit. Preferably the clock operates at the word rate rather than the serialised bit rate.

In an alternative arrangement shown in FIG. 3 two 8:1 multiplexers are used in parallel at a lower clock rate of 1.2 GHz. In this case a pair of A/D converters are used, operating at a clock rate one eighth of that of the multiplexers.

Although the embodiment discussed above relates to the distribution of television signals, the invention, in its broadest aspects, is applicable to other signals such as, e.g., audio signals.

We claim:

1. A method of distributing signals from a head-end station via a network comprising:
   combining a plurality of AM channels modulated on sub-carriers at different frequencies to form a composite analogue signal, treating the composite analogue signal to reduce the peak-to-mean ratio, digitizing the composite analogue signal, transmitting resulting digital data onto the network, and receiving the digital data at a receiver and reconstituting the composite analogue signal for reception at a termination.

2. A method according to claim 1, in which the network is an optical network, the receiver is an optical receiver, and the composite analogue signal is treated to reduce its peak-to-mean ratio by clipping the signal.

3. A method according to claim 1, including:

receiving the digitized signal at a node remote from the termination, and transmitting the reconstituted signal onwards for reception at the termination.

4. A method according to claim 1, including compressing the composite analogue signal at the head-end station and applying complementary expansion to the signal at the receiver.

5. A method according to claim 1, in which the signals distributed from the head-end station are television signals.

6. A method of distributing signals from a head-end station via a network comprising:

combining a plurality of AM channels modulated on sub-carriers at different frequencies to form a composite analogue signal, treating the composite analogue signal to reduce the peak-to-mean ratio, digitizing the composite analogue signal, transmitting resulting digital data onto the network, and receiving the digital data at a receiver and reconstituting the composite analogue signal for reception at a termination, the composite analogue signal having a bandwidth of one octave or less and being digitized by sampling at a sampling rate below the Nyquist rate.

7. A method as in claim 6, in which the network is an optical network, the receiver is an optical receiver, and the composite analogue signal is treated to reduce its peak-to-mean ratio by clipping the signal.

8. A method as in claim 6 including:

receiving the digitized signal at a node remote from the termination, and transmitting the reconstituted signal onwards for reception at the termination.

9. A method as in claim 6, including compressing the composite analogue signal at the head-end station and applying complementary expansion to the signal at the receiver.

10. A system for distributing signals comprising:

a head-end station, one or more receivers, a network connecting the head-end station to the or each receiver, the head-end station including an input stage arranged to receive a composite analogue signal comprising a plurality of AM channels modulated on sub-carriers at different frequencies, converter means arranged to treat the composite analogue signal to reduce the peak-to-mean ratio and to digitize the composite analogue signal, and transmitter means arranged to transmit the resulting digital data onto the network, and the receiver including reconstituting means arranged to reconstitute the composite analogue signal and output means arranged to output the composite analogue signal for reception by a termination.

11. A system according to claim 10, in which the network is an optical network, the receiver is an optical receiver, and the converter means are arranged to treat the composite analogue signal by clipping it.

12. A system according to claim 11, in which the or each optical receiver is located at a respective node remote from the termination and is arranged to transmit the reconstituted signal onwards for reception at the termination.

13. A system according to claims 10, further including compression means located in the head-end station and expansion means located in the or each receiver and arranged to apply complementary compression and expansion to the composite analogue signals.

14. A system for distributing signals comprising:

a head-end station, one or more receivers, a network connecting the head-end station to the or each receiver, the head-end station including an input stage arranged to receive a composite analogue signal comprising a plurality of AM channels modulated on sub-carriers at different frequencies, converter means arranged to treat the composite analogue signal to reduce the peak-to-mean ratio and to digitize the composite analogue signal, and transmitter means arranged to transmit the resulting digital data onto the network, and the receiver including reconstituting means arranged to reconstitute the composite analogue signal and output means arranged to output the composite analogue signal for reception by a termination, the composite analogue signal having a bandwidth of one octave or less and the converter means being arranged to sample the composite analogue signal at a sampling rate below the Nyquist rate.

15. A system according to claim 14, in which the network is an optical network, the receiver is an optical receiver, and the converter means are arranged to treat the composite analogue signal by clipping it.

16. A system as in claim 15, in which the or each optical receiver is located at a respective node remote from the termination and is arranged to transmit the reconstituted signal onwards for reception at the termination.

17. A system as in claim 14, further including compression means located in the head-end station and expansion means located in the or each receiver and arranged to apply complementary compression and expansion to the composite analogue signals.

18. A system as in claim 14, in which the signals distributed from the head-end station are television signals.

* * * * *